(12) United States Patent
Glaesser

(10) Patent No.: US 11,059,350 B2
(45) Date of Patent: Jul. 13, 2021

(54) VEHICLE HAVING AN AIR CONDITIONING UNIT WHICH HAS A PRECONDITIONING MODE

(71) Applicant: Bayerische Motoren Werke Aktiengesellschaft, Munich (DE)

(72) Inventor: Juergen Glaesser, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/788,905

(22) Filed: Feb. 12, 2020

(65) Prior Publication Data
US 2020/0307351 A1     Oct. 1, 2020

(30) Foreign Application Priority Data
Mar. 25, 2019 (DE) .................... 10 2019 107 613.7

(51) Int. Cl.
*B60H 1/00* (2006.01)

(52) U.S. Cl.
CPC ..... *B60H 1/00778* (2013.01); *B60H 1/00657* (2013.01); *B60H 1/00878* (2013.01); *B60H 2001/003* (2013.01)

(58) Field of Classification Search
CPC ............ B60H 1/00778; B60H 1/00657; B60H 1/00878; B60H 1/00849; B60H 1/00564; B60H 1/22; B60H 1/32; B60H 1/34; B60H 2001/003; B60H 2001/3485
See application file for complete search history.

(56) References Cited

U.S. PATENT DOCUMENTS

| | | | | | |
|---|---|---|---|---|---|
| 4,962,302 A | * | 10/1990 | Katsumi | ............ | B60H 1/00842 165/202 |
| 4,966,011 A | * | 10/1990 | Iida | ..................... | B60H 1/00842 165/42 |
| 4,966,012 A | * | 10/1990 | Iida | ..................... | B60H 1/00842 165/42 |
| 5,152,335 A | * | 10/1992 | Doi | ..................... | B60H 1/00842 165/204 |

(Continued)

FOREIGN PATENT DOCUMENTS

| | | |
|---|---|---|
| DE | 10 2013 202 601 A1 | 8/2014 |
| FR | 2 723 038 A1 | 2/1996 |

OTHER PUBLICATIONS

German-language Search Report issued in counterpart German Application No. 10 2019 107 613.7 dated Nov. 20, 2019 with partial English translation (11 pages).

*Primary Examiner* — Nelson J Nieves
(74) *Attorney, Agent, or Firm* — Crowell & Moring LLP

(57) ABSTRACT

A vehicle includes an air conditioning unit, a first air duct, a second air duct, a recirculation duct, and a recirculation flap. The recirculation flap is closed in an air conditioning mode of the air conditioning unit, in which mode air which is heated or cooled by the air conditioning unit is to be discharged via the first and/or second vent into the occupant compartment of the vehicle, so that an air stream in the recirculation duct is blocked. The recirculation flap is open in a preconditioning mode, so that air which is heated or cooled by the air conditioning unit is circulated in a circuit which is formed at least by way of the air conditioning unit, the first air duct, the second air duct and the recirculation duct.

8 Claims, 7 Drawing Sheets

(56) References Cited

U.S. PATENT DOCUMENTS

| | | | | |
|---|---|---|---|---|
| 5,186,682 A * | 2/1993 | Iida | B60H 1/0075 165/43 |
| 5,249,596 A * | 10/1993 | Hickenlooper, III | F24F 13/1426 137/334 |
| 5,267,451 A * | 12/1993 | Cleveland | F24F 11/027 165/108 |
| 5,626,186 A * | 5/1997 | Honda | B60H 1/0075 165/43 |
| 6,009,934 A * | 1/2000 | Sunaga | B60H 1/00064 165/42 |
| 6,282,911 B1 * | 9/2001 | Watanabe | B60H 1/00207 296/208 |
| 8,915,295 B2 * | 12/2014 | Norrell | F24F 11/70 165/284 |
| 9,919,581 B2 * | 3/2018 | Satzger | B60H 1/00828 |
| 2015/0343882 A1 | 12/2015 | Satzger et al. | |
| 2016/0368343 A1 * | 12/2016 | Venezia | B60H 1/00064 |
| 2019/0195528 A1 * | 6/2019 | Puranen | F24F 11/74 |
| 2020/0114723 A1 * | 4/2020 | Tani | B60H 1/00207 |
| 2020/0130464 A1 * | 4/2020 | Kwon | B60H 1/00064 |
| 2020/0300497 A1 * | 9/2020 | Goel | F24F 11/65 |

* cited by examiner

VEHICLE HAVING AN AIR CONDITIONING UNIT WHICH HAS A PRECONDITIONING MODE

CROSS REFERENCE TO RELATED APPLICATION

This application claims priority under 35 U.S.C. § 119 from German Patent Application No. 10 2019 107 613.7, filed Mar. 25, 2019, the entire disclosure of which is herein expressly incorporated by reference.

BACKGROUND AND SUMMARY OF THE INVENTION

The embodiments of the invention relate to a vehicle having an air conditioning unit.

An occupant compartment of a parked vehicle may heat up or cool down. In order to provide more comfort, engine-independent vehicle heaters are known from the prior art, in order to preheat the occupant compartment of a parked vehicle before the commencement of driving. Engine-independent air conditioning systems are likewise known, in order to precool the occupant compartment of a parked vehicle before the commencement of driving. These approaches have the disadvantage, however, that they are relatively energy-intensive because they have to pre-control the temperature of the entire occupant compartment In the case of electric vehicles, in particular, a temperature pre-control of this type is limited to a relatively short time period, because otherwise too much energy is consumed, which would reduce the range. This then requires, however, a relatively precise termination of the temperature pre-control. Should a commencement of driving be delayed and the temperature pre-control have to be switched off again for reasons of energy efficiency, the effect of the temperature pre-control would be lost relatively rapidly.

It is therefore one object of the present invention to provide a more efficient preconditioning of a vehicle. This and other objects are achieved by way of a vehicle having an air conditioning unit which has a fan; a first air duct which guides air from the air conditioning unit to a first vent, via which air can be discharged into an occupant compartment of the vehicle; a second air duct which guides air from the air conditioning unit to a second vent, via which air can be discharged into the occupant compartment of the vehicle, and which second vent is spaced apart from the first vent; a recirculation duct which connects the first and second air duct to one another; a recirculation flap which is arranged in the recirculation duct for allowing or blocking an air stream in the recirculation duct; the recirculation flap being closed in an air conditioning mode, in particular a heating or cooling mode, of the air conditioning unit, in which mode air which is heated or cooled by the air conditioning unit is to be discharged via the first and/or second vent into the occupant compartment of the vehicle, with the result that an air stream in the recirculation duct is blocked; the recirculation flap being open in a preconditioning mode, in particular a heating preconditioning mode or a cooling preconditioning mode, with the result that air which is heated or cooled by the air conditioning unit can be circulated in a circuit which is formed at least by way of the air conditioning unit, the first air duct, the second air duct and the recirculation duct. Said exemplary embodiment has the advantage that the entire occupant compartment of a vehicle is not preconditioned, but rather merely the climate control system, as a result of which preconditioning is possible with substantially lower energy expenditure. In the case of the commencement of driving, cold or warm air can be provided from the vents without a substantial delay, with the result that the occupants of the vehicle can immediately perceive the desired temperature control and a substantially more rapid temperature control of the occupant compartment is possible in comparison with a state without preconditioning.

The vehicle may be configured in such a way that the air conditioning unit has a fan space, in which the fan is arranged, a flap space, to which the first and second air duct are connected, and an air temperature control unit, the vehicle having, furthermore, a first flap for allowing or blocking an air stream from the flap space into the first air duct or vice versa; a second flap for allowing or blocking an air stream from the flap space into the second air duct or vice versa, and a first fan flap for allowing or blocking an air stream from the fan space into the second air duct or vice versa.

The vehicle may be configured in such a way that an air feed means, via which fresh air and/or recirculated air can be fed in, opens into the fan space.

The vehicle may have, furthermore, a control unit which is adapted to actuate the first flap, the second flap, the recirculation flap and the first fan flap, the control unit being adapted to perform a cooling mode and/or heating mode, in which the recirculation flap and the first fan flap are closed and the first and/or second flap are/is open, and the control unit being adapted to perform a cooling preconditioning mode, in which the recirculation flap, the first fan flap and the first flap are open and the second flap is closed.

The vehicle may have, furthermore, a bypass duct which leads from the fan space, in particular a suction side of the fan space, to the first air duct, bypassing the air temperature control unit, and opens at one point into the first air duct which is closer to the recirculation flap in terms of the air stream than the first flap, a second fan flap being provided, furthermore, for allowing or blocking an air stream from the bypass duct into the fan space or vice versa.

The control unit may be adapted to perform a heating preconditioning mode, in which the recirculation flap, the second fan flap and the second flap are open and the first flap and the first fan flap are closed.

The vehicle may be configured in such a way that the first vent is spaced apart from the second vent by more than 20 cm.

The vehicle may be configured in such a way that the first vent is assigned to one of the following ventilation zones: a footwell, a window space or a ventilation zone which is arranged between them, and that the second vent is assigned to another one of said ventilation zones.

Other objects, advantages and novel features of the present invention will become apparent from the following detailed description of one or more preferred embodiments when considered in conjunction with the accompanying drawings.

DETAILED DESCRIPTION OF EMBODIMENTS

Figure 1:
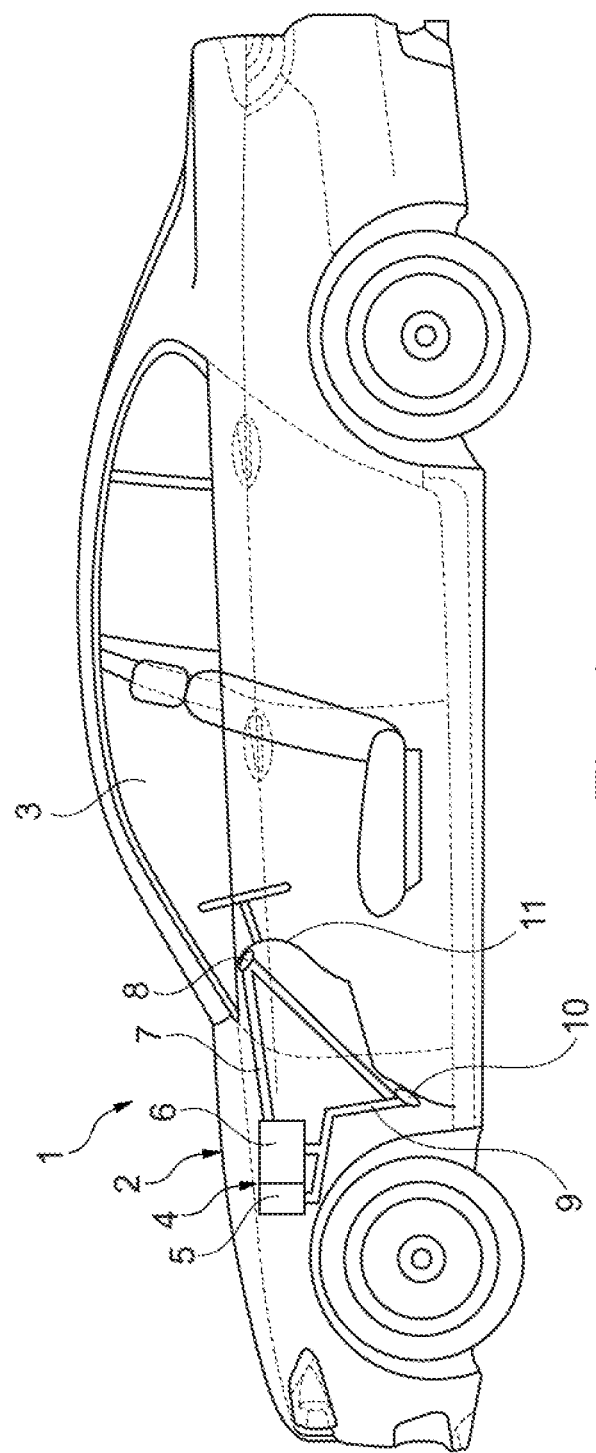
FIG. 1 shows a vehicle having a climate control system.

FIG. 1 shows a vehicle 1 having a climate control system 2 in accordance with one exemplary embodiment of the invention. The vehicle is preferably a vehicle with a hybrid drive (electric drive and internal combustion engine), or an electric vehicle (driven purely electrically), but can also be a vehicle with an internal combustion engine. The vehicle 1 is, in particular, a passenger motor car. In the vehicle 1, an occupant compartment 3 is configured, in which the occupants of the vehicle 1 reside during driving of said vehicle 1.

Figure 2:
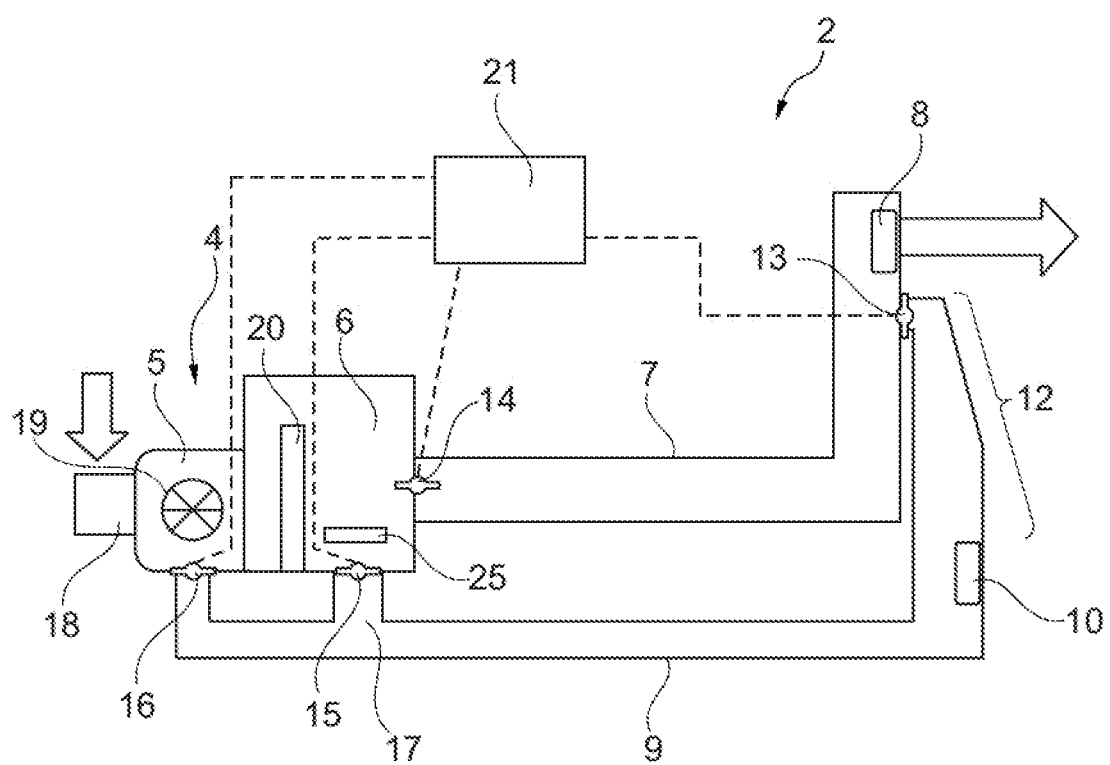
FIG. 2 shows the climate control system of the vehicle from FIG. 1 in a normal cooling mode.

FIG. 2 diagrammatically shows the climate control system 2 of the vehicle 1 from FIG. 1. The climate control system 2 has an air conditioning unit 4 which has a fan space 5 and a flap space 6 which are preferably configured by means of separate housings, but can also be configured within a single housing. At any rate, the air conditioning unit 4 is adapted to heat or to cool air which flows through it.

Furthermore, the climate control system 2 has a first air duct 7 which extends from the flap space 6 to a first vent 8, and a second air duct 9 which extends from the flap space 6 to a second vent 10. The first and second vents 8, 10 are air outlet openings which open into the occupant compartment 3. In particular, the first and second vent 8, 10 are assigned to one of three ventilation zones which are spaced apart from one another vertically. A lowermost ventilation zone is formed by a foot region (that is to say, in the lower region of the occupant compartment 3), a second ventilation zone is, for example, at the level of the dashboard 11, and a third ventilation zone is a ventilation which is directed toward the windows, in particular in a manner which is directed toward a windshield. In FIGS. 1 to 6, for example, the first vent 8 is arranged in the dashboard 11, and the second vent 10 is arranged in the foot region. Here, as in this case, the two vents 8, 10 can be assigned to different ventilation zones, or they can be assigned to the same ventilation zone, as shown in FIG. 7, for example. For example, the first and second vent 8, 10 can both be arranged in the dashboard 11, the first vent 8 being arranged on the left in the dashboard 11, and the second vent 10 being arranged on the right in the dashboard 11. Moreover, the invention is not restricted to two vents, but there are usually more than two vents in the vehicle 1. Here, for example, there are a plurality of vents 8 in the first air duct 7 and a plurality of vents 10 in the second air duct 10.

The first air duct 7 and the second air duct 9 are configured as tubular ducts and run separately from one another. The first air duct 7 is connected to the second air duct 9 via a recirculation duct 12, in particular in a region close to the first and second vent 8, 10. Apart from said connection via the recirculation duct 12 and a potential connection via the air conditioning unit 9, there is no connection in terms of the air stream between the first air duct 7 and the second air duct 9. A recirculation flap 13 is arranged in the recirculation duct 12, by means of which recirculation flap 13 an air stream in the recirculation duct 12 can be allowed or blocked. If the recirculation flap 13 is open, an air stream in the recirculation duct 12 is allowed and the first air duct 7 is connected to the second air duct 9 via the recirculation duct 12. If the recirculation flap 13 is closed, an air stream in the recirculation duct 12 is blocked and the first air duct 7 is not connected to the second air duct 9 in the region of the recirculation duct 12. Intermediate positions of the recirculation flap 13 are of course also possible. Furthermore, there is a first flap 14 for allowing or blocking an air stream from the flap space 6 into the first air duct 7 or vice versa. In particular, the first flap 14 is arranged in the transition region from the flap space 6 into the first air duct 7. Moreover, there is a second flap 15 for allowing or blocking an air stream from the flap space 6 into the second air duct 9 or vice versa. In particular, the second flap 15 is arranged in the transition region from the flap space 6 into the second air duct 9. In addition to the flap space 6, the second air duct 9 is likewise connected to the fan space 5. Here, a first fan flap 16 is provided for allowing or blocking an air stream from the second air duct 9 into the fan space 5 or vice versa. A duct section leads at a branch point 17 of the second air duct 9 via the first fan flap 16 into the fan space 5 (in particular, to a suction connector of the fan space 5), a duct section leads via the second flap 15 into the flap space 6, and a further duct section leads to the second vent 10.

A fan 19 is arranged in the fan space 5, which fan 19 is adapted to suck in fresh air and/or recirculated air via an air supply means 18, and to suck in air from the second air duct 9 via the open first fan flap 16 (suction connector). Furthermore, the fan 19 can, for example, eject air from the open first flap 14 and/or the open second flap 15 into the respective associated air duct 7 and/or 9, respectively.

An air temperature control unit is arranged in the air conditioning unit 4, as viewed in terms of the air stream, between the fan space 5, in particular the fan 19 thereof, and the two flaps, the first flap 14 and the second flap 15. That is to say, air which flows from the fan space 5 to the two flaps 14 and 15 flows through the air temperature control unit or flows past the latter in such a way that the air can be heated or cooled. The air temperature control unit can be, for example, an evaporator 20 and/or a heat exchanger and/or an electric heating element 25 (for example, a PTC element). The evaporator 20 is a component of a refrigerant circuit (not shown) which has an electric compressor, with the result that the evaporator is cooled in a known way by way of driving of the electric compressor.

A control unit 21 is connected electrically to the first flap 14, the second flap 15, the first fan flap 16 and the circulation flap 13, in order to actuate them correspondingly, that is to say to open, to close or to move them into an intermediate position. The control unit 21 is adapted to perform a cooling mode, a heating mode, a cooling preconditioning mode and optionally a heating preconditioning mode which will be described in greater detail in the following text.

In a normal cooling mode which is shown diagrammatically in FIG. 2, the first flap 14 is open, the second flap 15 is closed, the fan flap 16 is closed and the circulation flap 13 is closed. The refrigerant circuit is operated, with the result that the evaporator 20 is cooled. The fan 19 sucks in fresh air and/or recirculated air via the air supply means 18, and blows said air via the cold evaporator 20 and the open first flap 14 into the first air duct 7. As an alternative or in addition, said air might also be blown via an open second flap 15 into the second air duct 9. Via the first air duct 7, the cool air is blown via the first vent 8 into the occupant compartment 3.

Figure 3:
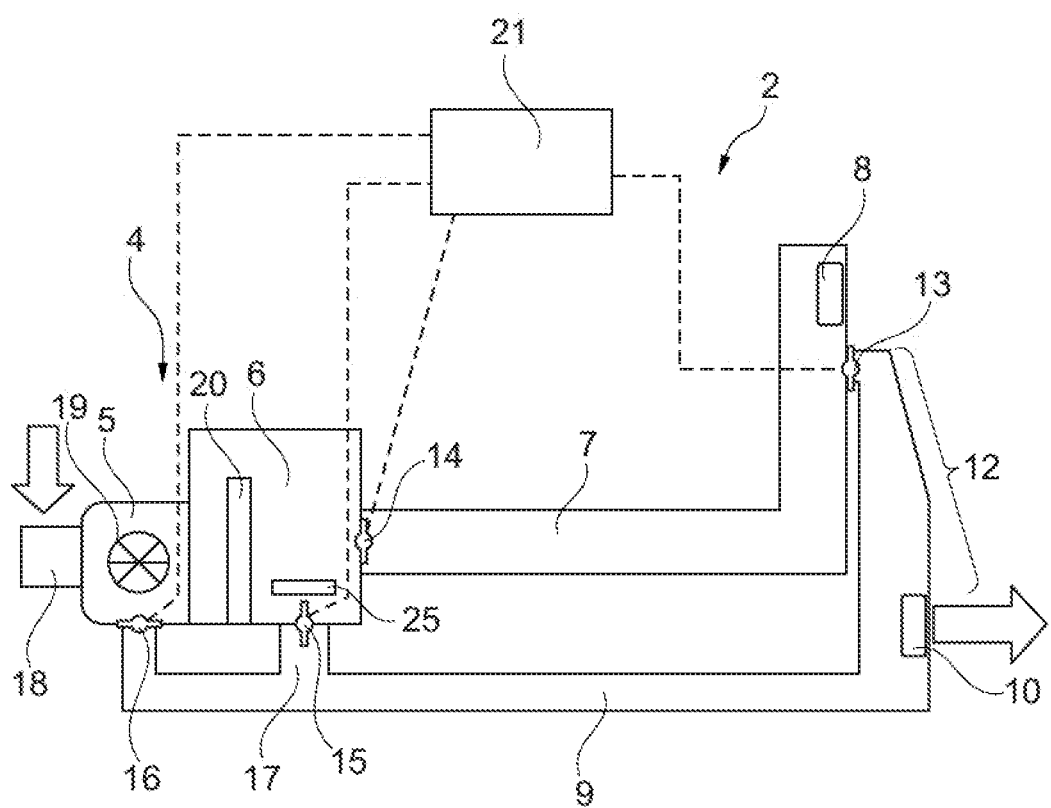
FIG. 3 shows the climate control system from FIG. 2 in a normal heating mode.

In a normal heating mode which is shown diagrammatically in FIG. 3, the first flap 14 is closed, the second flap 15 is open, the first fan flap 16 is closed and the recirculation flap 13 is likewise closed. The fan 19 sucks in fresh air and/or recirculated air via the air supply means 18, said air is heated in the air conditioning unit 4, for example by being guided through or past a heated heat exchanger (not shown) or the electric heating element 25 (for example, a PTC element), and is subsequently blown via the open second flap 15 into the second air duct 9. As an alternative or in addition, said air might also be blown via an open first flap 14 into the first air duct 7. Via the second air duct 9, the air is blown via the second vent 10 into the occupant compartment 3.

Figure 4:
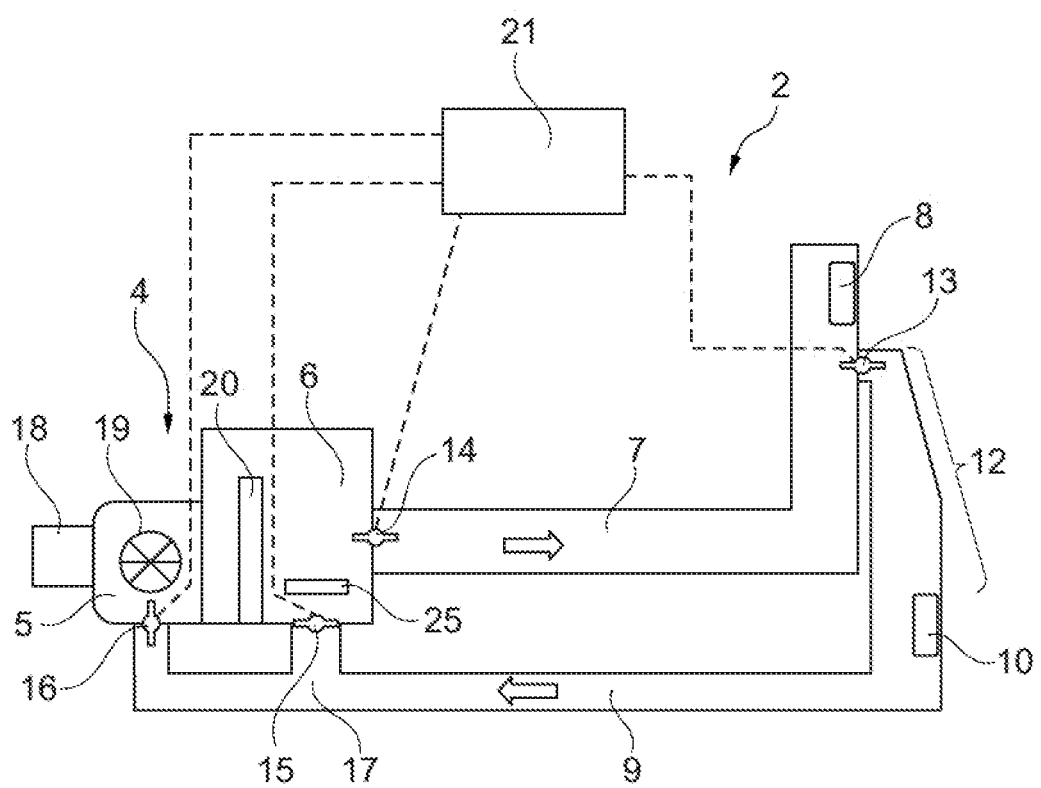
FIG. 4 shows the climate control system from FIG. 2 in a cooling preconditioning mode.

FIG. 4 diagrammatically shows a cooling preconditioning mode of the climate control system 2. For this purpose, the control unit 21 is adapted in such a way that it actuates the flaps in such a way that the first flap 14 is open, the second flap 15 is closed, the first fan flap 16 is open and the recirculation flap 13 is open. The refrigerant circuit is operated electrically, with the result that the evaporator 20 is cooled. The fan 19 then sucks in air via the open first fan flap 16 from the second air duct 9, conducts said air via the cold evaporator 20, and blows it via the open first flap 14 into the first air duct 7. After flowing through the first air duct 7, said air is sucked by way of the negative pressure which is generated by the fan 19 via the recirculation duct 12 and its open recirculation flap 13 into the second air duct, until said air arrives again at the fan 19. In this way, cooled air is circulated in the first air duct 7, in the second air duct 9 and in the air conditioning unit 4, with the result that at least said components are pre-cooled by way of preconditioning before commencement of driving.

After said cooling preconditioning, switching over into the normal cooling mode which is shown in FIG. 2 can be carried out in the case of commencement of driving, it being possible for cool air to be blown out of the first vent 8 and/or the second vent 10 without a substantial time delay. As a result, in the case of an overheated occupant compartment 3, the occupants experience immediate relief by way of rapid provision of cool air. It goes without saying that the air circulation direction can also be reversed in the case of the cooling preconditioning, to which end the fan 19 would have to generate a correspondingly reversed air stream.

Figure 5:
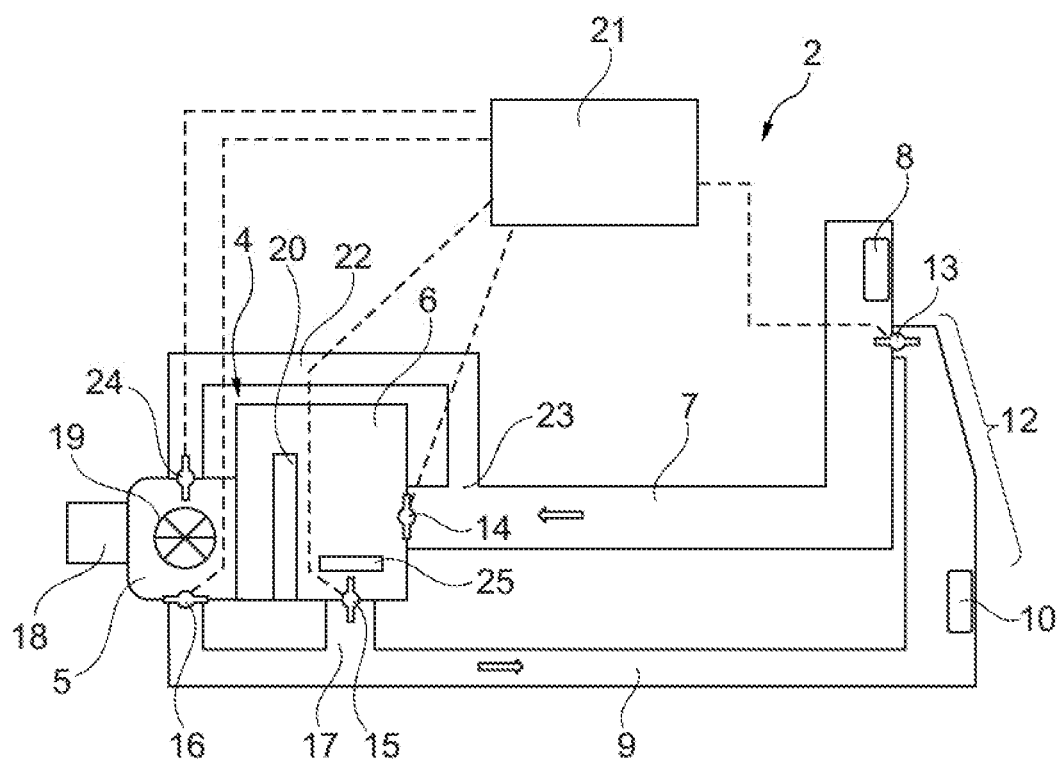
FIG. 5 shows the climate control system from FIG. 2 in a heating preconditioning mode.

FIG. 5 diagrammatically shows the climate control system 2 in a heating preconditioning mode. If, in addition to the cooling preconditioning mode, the climate control system 2 is also to be adapted for a heating preconditioning mode, the climate control system 2 has a bypass duct 12 in addition to the above-described elements and functions, which bypass duct 12 leads from the fan space 5 to the first air duct 7, bypassing the air temperature control unit, and opens at a point 23 into the first air duct 7 which is arranged closer in terms of the air stream to the recirculation flap 13 than the first flap 14. A second fan flap 24 is provided in the bypass duct 22 for allowing or blocking an air stream from the bypass duct 22 into the fan space 5 or vice versa. The bypass duct 22 is preferably connected to a suction side of the fan space 5 (that is to say, stream from the first air duct 7 via the bypass duct 22 into the fan space 5). In particular, the second fan flap 24 is provided in the region of the transition from the fan space 5 into the bypass duct 22.

For the heating preconditioning mode, the control unit 21 is additionally connected electrically to the second fan flap 24, in order to actuate the latter accordingly, that is to say to open, to close or to move it into an intermediate position. For the heating preconditioning mode, furthermore, the control unit 21 is adapted in such a way that it actuates the flaps in such a way that the first flap 14 is closed, the second flap 15 is open, the first fan flap 16 is closed, the second fan flap 24 is open and the recirculation flap 13 is open. The fan 19 then sucks in air via the open second fan flap 24 via the bypass duct 22 from the first air duct 7, conducts said air via the warm heating element 25, and blows it via the open second flap 15 into the second air duct 9. After flowing through the second air duct 9, said air is sucked by way of the negative pressure which is generated by the fan 19 via the recirculation duct 12 and its open recirculation flap 13 into the first air duct 7, until the air arrives again at the fan 19 via the bypass duct 22. In this way, the heated air is circulated in the first air duct 7 and in the second air duct 9 and in the air conditioning unit 9, with the result that at least said components are preheated by way of said preconditioning before commencement of driving. As a result of said heating preconditioning, switching into the normal heating mode can be carried out in the case of commencement of driving, warm air being available immediately at the vents at the commencement of driving. In the case of the heating preconditioning, it goes without saying that the air circulation direction can also be reversed, to which end the fan 19 would have to generate a correspondingly reversed air stream.

Figure 6:
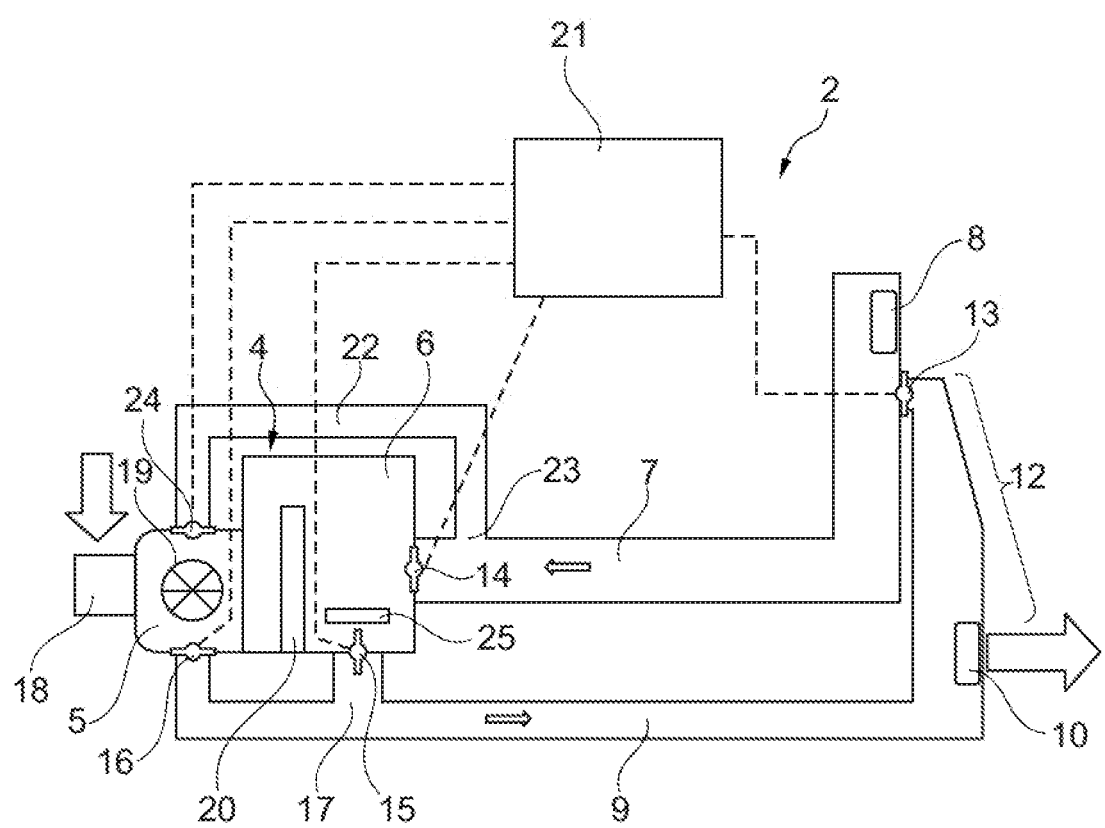
FIG. 6 shows the climate control system from FIG. 2 in a normal heating mode after a heating preconditioning mode.
Figure 7:
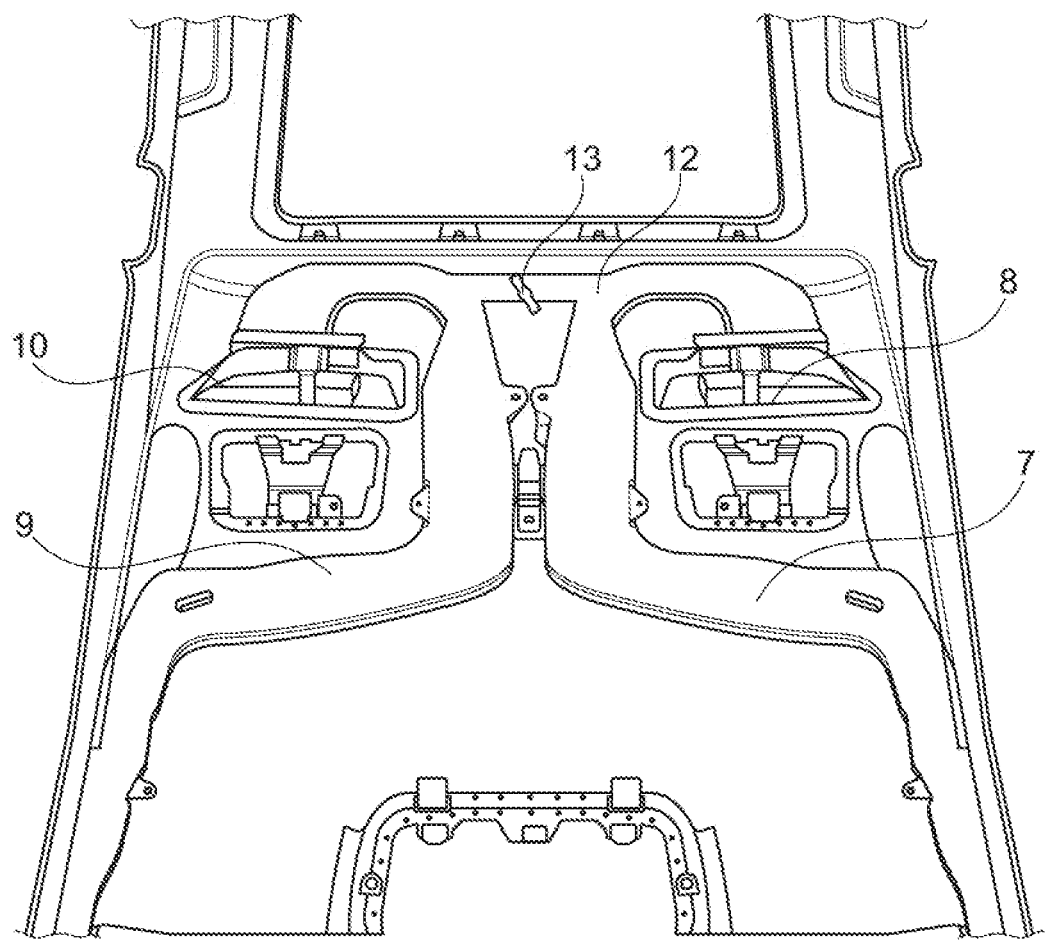
FIG. 7 shows one modification of the climate control system, in the case of which vents are arranged in the same ventilation zone.

FIG. 6 diagrammatically shows the climate control system 2 in a normal heating mode after a heating preconditioning mode. Said normal heating mode after a heating preconditioning mode corresponds in principle to the heating mode which is shown in FIG. 3, since, as a result of the closed second fan flap 24, the connection corresponds to that of FIG. 3. As shown in FIG. 6, the first flap 14 is closed, the second flap 15 is open, the first fan flap 16 is closed, the second fan flap 24 is closed and the recirculation flap 13 is likewise closed. The fan 19 sucks in fresh air and/or recirculated air via the air supply means 18, said air is heated in the air conditioning unit 4, for example by being guided through or past the heated heat exchanger (not shown) or the electric heating element 25, and is subsequently blown via the open second flap 15 into the second air duct 9. As an alternative or in addition, said air can also be blown via an open first flap 14 into the first air duct. Via the second air duct 9, the air is blown via the second vent 10 into the occupant compartment 3.

As described above, the two vents 8, 10 can be assigned to different ventilation zones, or they can be assigned to the same ventilation zone. FIG. 7 shows one example, in which the vents 8, 10 are assigned to the same ventilation zone. Here, for example, the vents 8 and 10 are arranged in an upper ventilation zone on the vehicle headliner. The first and second air duct 7 and 9 can be connected to one another via the recirculation duct 12 and the recirculation flap 13, as described above. Otherwise, the above description also applies to FIG. 7.

While the embodiments of the invention have been illustrated and described in detail in the drawings and the preceding description, said description is to be understood to be illustrative or exemplary and not restrictive, and it is not intended for the invention to be restricted to the disclosed exemplary embodiment. The mere fact that certain features are mentioned in various dependent claims should not indicate that a combination of said features might not also be used advantageously.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising:
   an air conditioning unit which has a fan;

a first air duct which guides air from the air conditioning unit to a first vent, via which air is dischargeable into an occupant compartment of the vehicle;

a second air duct which guides air from the air conditioning unit to a second vent, via which air is dischargeable into the occupant compartment of the vehicle, the second vent being spaced apart from the first vent;

a recirculation duct which connects the first and second air duct to one another;

a recirculation flap which is arranged in the recirculation duct for allowing or blocking an air stream in the recirculation duct;

the recirculation flap being closed in an air conditioning mode of the air conditioning unit, in which mode air which is heated or cooled by the air conditioning unit is to be discharged via the first and/or second vent into the occupant compartment of the vehicle, so that an air stream in the recirculation duct is blocked, and the recirculation flap being open in a preconditioning mode, so that air which is heated or cooled by the air conditioning unit is circulated in a circuit which is formed at least by way of the air conditioning unit, the first air duct, the second air duct and the recirculation duct.

2. The vehicle according to claim 1, wherein the air conditioning unit has a fan space, in which the fan is arranged, a flap space, to which the first and second air duct are connected, and an air temperature control unit, the vehicle further comprising:

a first flap configured to allow or block an air stream from the flap space into the first air duct or vice versa;

a second flap configured to allow or block an air stream from the flap space into the second air duct or vice versa, and a first fan flap configured to allow or block an air stream from the second air duct into the fan space or vice versa.

3. The vehicle according to claim 2, wherein an air feed means, via which fresh air and/or recirculated air is fed in, the air feed means opening into the fan space.

4. The vehicle according to claim 3, further comprising: a control unit which is configured to actuate the first flap, the second flap, the recirculation flap and the first fan flap, the control unit being configured to perform a cooling mode and/or heating mode, in which the recirculation flap and the fan flap are closed and the first and/or second flap are/is open, and the control unit being configured to perform a cooling preconditioning mode, in which the recirculation flap, the first fan flap and the first flap are open and the second flap is closed.

5. The vehicle according to claim 4, further comprising: a bypass duct which leads from the fan space to the first air duct, bypassing the air temperature control unit, and opens at one point into the first air duct which is closer to the recirculation flap in terms of the air stream than the first flap, a second fan flap being configured to allow or block an air stream from the bypass duct into the fan space or vice versa.

6. The vehicle according to claim 5, wherein the control unit is configured to perform a heating preconditioning mode, in which the recirculation flap, the second fan flap and the second flap are open and the first flap and the first fan flap are closed.

7. The vehicle according to claim 6, wherein the first vent is spaced apart from the second vent by more than 20 cm.

8. The vehicle according to claim 7, wherein the first vent is assigned to one of the following ventilation zones: a footwell, a window space or a ventilation zone which is arranged between them, and the second vent is assigned to another one of said ventilation zones.

\* \* \* \* \*